March 31, 1959
L. A. SCOTT
2,879,814
ATTACHMENT FOR CONVERTING A PORTABLE CIRCULAR SAW TO A CHAIN SAW
Filed May 21, 1957
2 Sheets-Sheet 2
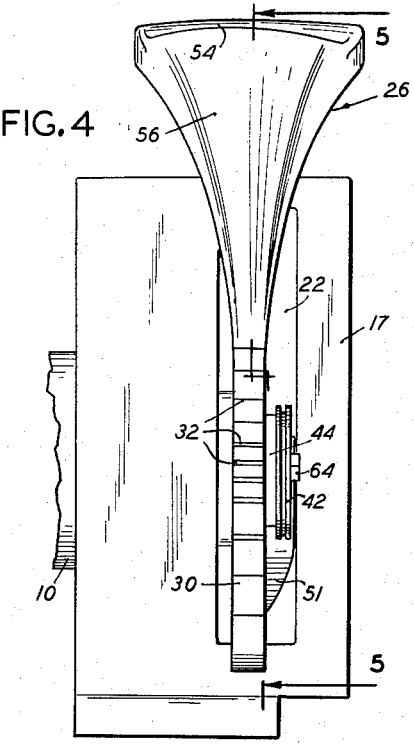
FIG. 4
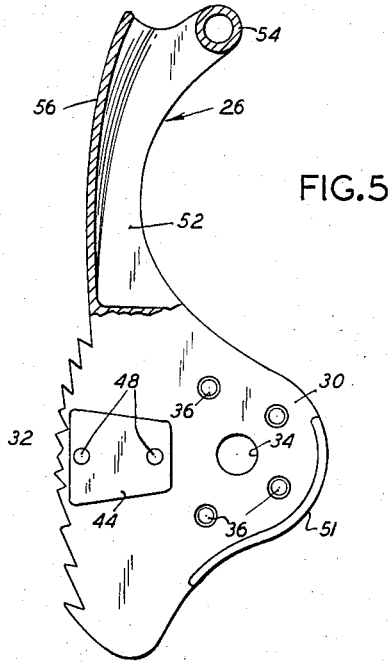
FIG. 5
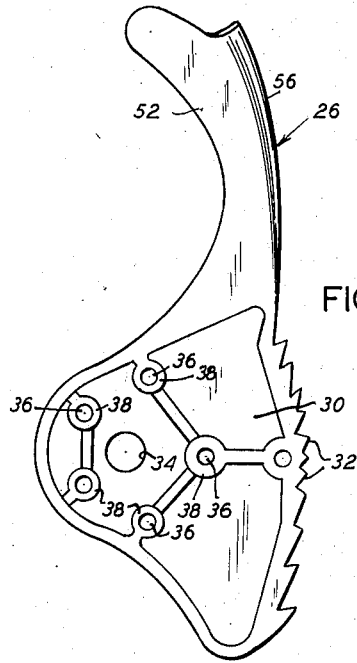
FIG. 6
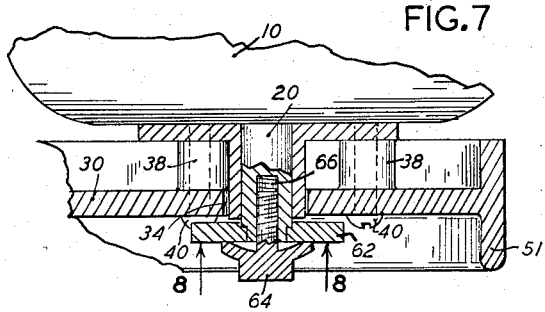
FIG. 7
FIG. 8
INVENTOR.
LEWIS A. SCOTT
BY
Buckhorn, Cheatham + Blore
ATTORNEYS

United States Patent Office 2,879,814
Patented Mar. 31, 1959

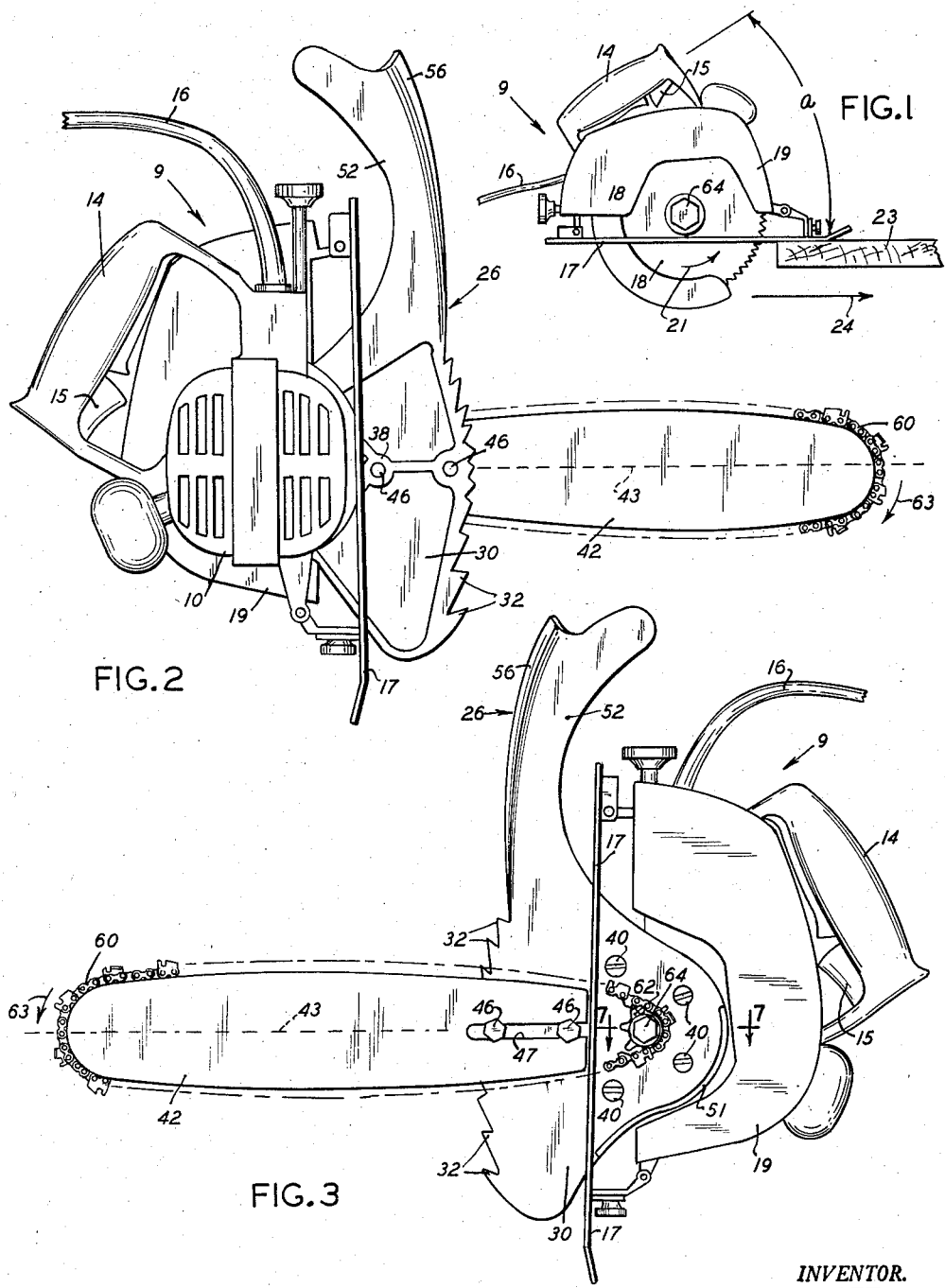

2,879,814

ATTACHMENT FOR CONVERTING A PORTABLE CIRCULAR SAW TO A CHAIN SAW

Lewis A. Scott, Portland, Oreg., assignor to Omark Industries, Inc., a corporation of Oregon Application May 21, 1957, Serial No. 660,605

5 Claims. (Cl. 143—32)

The present invention relates to power saws and more particularly to an attachment for converting a portable, powered, circular saw to a chain saw.

Portable electric motor-driven circular saws are presently available and widely used by carpenters and other construction workers. Such saws, while exceedingly useful, have a rather limited depth of cut, sufficient for most boards and planks but not sufficient that they can conveniently be used to cut the posts or timbers of substantial width and thickness that are regularly encountered in construction work. Such thick members are in most instances not encountered with such frequency as to warrant or justify maintaining a conventional chain saw which is, of course, well adapted for cutting thick members.

It is therefore an object of the invention to provide an attachment for quickly and simply converting a conventional electric motor-driven, circular saw to a chain saw.

It is a particular object of the invention to provide an attachment for converting a powered circular saw to a chain saw that may be quickly and easily attached or removed so that the saw may be used interchangeably as a circular saw or as a chain saw.

Another object of the invention is to provide an attachment of the class described which enables the saw when used as a chain saw to be held conveniently and comfortably by the operator.

A further object is to provide a conversion attachment of the class described so constructed as to provide a protective safety guard for the operator.

Other objects and advantages of the invention will become apparent hereinafter.

In accordance with the illustrated embodiment of the invention there is provided an adapter or conversion attachment including a flat body portion adapted to be secured to the frame of a powered circular saw so as to extend about the drive shaft on which the circular saw blade is usually mounted. Means are provided for securing to the attachment a saw bar for supporting a saw chain which is driven by a sprocket mounted on the drive shaft of the saw. A handle is incorporated in the attachment for grasping by one hand of the operator and is so positioned thereon as to enable the conventional handle of the saw to be grasped comfortably and conveniently by the operation with his other hand. A protective shield is also incorporated in the attachment handle.

For a more detailed description of the invention, reference is made to the accompanying drawings wherein Fig. 1 is a side elevation of a typical electric handsaw unit that may be converted to a chain saw in accordance with the invention;

Fig. 2 is an enlarged side elevation of the handsaw unit equipped with a saw chain attachment in accordance with the present invention;

Fig. 3 is a side elevation of the saw from the side opposite that shown in Fig. 2;

Fig. 4 is a fragmentary front elevation of the saw with the attachment of the invention secured thereto;

Fig. 5 is a side view partly in elevation and partly in vertical section of the attachment of the invention as viewed along the line 5—5 of Fig. 4;

Fig. 6 is a side elevation of the attachment of the invention viewed from the side opposite that shown in Fig. 5;

Fig. 7 is an enlarged sectional view taken substantially along line 7—7 of Fig. 3; and Fig. 8 is a sectional view taken substantially along line 8—8 of Fig. 7.

Referring to the drawings, and particularly to Figs. 1 and 2, the invention is illustrated in connection with an electric handsaw unit 9 including an electric motor 10 mounted on a suitable frame including a handle 14 in which a finger actuated trigger 15 is provided for actuating a switch controlling the motor which may be connected to a suitable source of power by a cord 16. The illustrated saw is of the type including a guide plate 17 which is adapted to engage the surface of the work when the circular saw blade 18 is mounted on the saw, the guide plate being adjustably mounted in conventional manner upon a stationary saw blade guard 19.

The blade 18 is mounted on a shaft 20 (Fig. 7) driven by the motor 10 so that the blade revolves in the direction indicated by the arrow 21 in Fig. 1. The saw blade 18 protrudes through an opening 22 (Fig. 4) formed in the guide plate 17 so as to extend beneath the bottom surface thereof, that is, that surface exposed to view in Fig. 4. The guide plate is adjustable so that the depth of cut of the blade may be regulated.

Referring again to Fig. 1, normally a portable circular saw such as illustrated is positioned on a work piece, indicated at 23, with the guide plate 17 engaging the surface of the work piece, the saw being advanced in the direction of the arrow 24 as the cut is made. It will be noted that the handle 14 is positioned rearwardly of the shaft 20 with respect to the direction of movement of the saw and extends at an acute angle $a$ with respect to the plane of the guide plate 17 so that the handle may be gripped comfortably by one hand of the operator.

In accordance with the invention, means are provided whereby a saw chain unit may be mounted on the saw in place of the circular saw 18, such means comprising a handle member or attachment 26 including a substantially flat body portion 30 having a forward edge formed with a series of teeth 32 for engaging the work piece to be cut by the saw so as to assist in retaining the saw in position. The body portion 30 is formed near its rearward portion with an enlarged aperture 34 (Figs. 6 and 7) adapted to surround the shaft 20 when the attachment 26 is mounted on the saw unit 9, and for which latter purpose the body portion 30 is provided with a plurality of openings 36 through which studs 40 may extend to engage in tapped bores in the frame of the saw. Such tapped bores are normally employed for securing the journal portion of a conventional movable saw blade guard to the saw frame. As shown in Figs. 2, 3 and 4, in mounting the attachment the rearward portion is inserted through the opening 22 in the guide plate 17. Bosses 38 of suitable height may be provided on the side of the body portion 30 which engage the frame of the saw to position the attachment 26 relative to the frame.

Means are provided on the body portion 30 for securing thereto one end of an elongate, flat saw bar 42 with the axis 43 of the bar extending substantially at right angles to the guide plate 17, such means in the illustrated embodiment comprising a pad 44 formed on the face of the body portion opposite that on which the bosses 38 are formed and against which pad a side of the saw bar end is positioned as best shown in Fig. 4. The saw bar is clamped against the pad 44 by means of bolts 46 (Fig. 3) which extend through a slot 47 in the saw bar and are received in screw-threaded bores 48 formed in the body portion. A reinforcing and chip deflecting rib 51 may be provided upon the rearward edge of the body portion 30.

The attachment 26 includes a hand grip portion 52 integral with the body unit 30 and extending therefrom in a direction at right angles to the longitudinal axis 43 of the saw bar 42, so as to be positioned above and laterally spaced from the saw handle 14. The hand grip portion 52 includes a handle member 54 adapted to be grasped by an operator's hand, which handle member preferably extends equidistantly on the opposite sides of the body portion 30, as best shown in Fig. 4. The hand grip portion 52 also includes a guard portion 56 in the form of a concave-convex member positioned forwardly of the handle member 54 with the concave side facing rearwardly so that the opposite sides of the guard partially enclose the hand grasping the handle member 54. The guard portion 56 serves to protect the hand of the operator from the saw chain and from engagement with the work as the saw is moved through a cut.

The saw bar 42 is adapted to support a saw chain 60 of any suitable type, which chain is adapted to be driven by a sprocket 62 formed to fit upon the shaft 20 and to be driven thereby in the direction indicated by the arrow 63 (Fig. 3). The sprocket may be held upon the shaft 20 by the means provided for holding the circular saw blade thereon, such as a stud 64 engaged in an aperture 66 (Fig. 7) in the shaft 20.

Assuming a cut is to be made moving downwardly through a horizontally disposed timber, the saw handle 14 is grasped with one hand, ordinarily the right hand, and the attachment handle member 54 is grasped with the other hand. It will be observed that the handle 14 is disposed at a comfortable and convenient angle for grasping. The teeth 32 are then engaged on the work piece to be cut and after the motor 10 is started by manipulating switch 15 to place the chain in motion, the saw is tilted, using the teeth 32 as a pivot point, to move the saw bar 42 downwardly and bring the saw chain cutters into engagement with the work piece. It will be noted that the chain in engagement with the work is moving towards the motor 10 so that the engagement of the teeth 32 with the work piece pulls the saw against the work piece. If it is desired to replace the saw chain 60 with the circular saw blade 18, the sprocket 62 and member 26 may simply be detached and the movable saw guard mounted in place of the handle member and the circular saw 18 then mounted upon the shaft 20.

Having illustrated and described a preferred embodiment of the invention, it should be understood that the invention is susceptible of modification in whole or in part. I claim all such modifications as come within the true spirit and scope of the appended claims.

I claim:

1. An attachment for converting to a chain saw a portable electric motor-driven circular saw including a motor, a saw blade supporting shaft driven by said motor, a frame including a substantially planar guide plate adapted to engage the surface of a work piece being cut, and a saw handle disposed at an acute angle with respect to the plane of said guide plate and rearwardly of said shaft with respect to the direction of movement of the saw when used as a circular saw, said attachment comprising a unitary hand grip and chain saw guide bar supporting member including a flat body portion having an aperture therethrough and attaching means for securing the body portion to said frame in a predetermined position relative thereto with said shaft projecting through said aperture, means on said body portion for securing thereto one end of an elongate chain saw guide bar with the longitudinal axis of said chain saw guide bar extending substantially at right angles to said guide plate, and a hand grip portion integral with said body portion and having a handle member extending at right angles to the plane of said body portion, said handle member being spaced from said body aperture in a direction at right angles to said axis and being positioned on the same side of said axis as said saw handle so that when said attachment handle member is positioned uppermost and is gripped by one hand of the operator, said saw handle will be inverted and disposed at a convenient and comfortable angle for gripping by the other hand of the operator, said hand grip portion also having an integral protective shield portion for said other hand of the operator, said shield portion being spaced from said handle member and positioned between said handle member and said bar.

2. An attachment for converting to a chain saw a portable electric motor-driven circular saw including a motor, a saw blade supporting shaft driven by said motor, a frame including a substantially planar guide plate adapted to engage the surface of a work piece being cut, and a saw handle disposed at an acute angle with respect to the plane of said guide plate and rearwardly of said shaft with respect to the direction of movement of the saw when used as a circular saw, said attachment comprising a hand grip and chain saw guide bar supporting member including a flat body portion having an aperture therethrough and attaching means for securing the body portion to said frame in a predetermined position relative thereto with said shaft projecting through said aperture, an elongate chain saw guide bar secured to said body portion with the longitudinal axis of said chain saw guide bar extending substantially at right angles to the plane of said guide plate, and a hand grip portion integral with said body portion and having a handle member extending at right angles to the plane of said body portion, said handle member being spaced from said aperture in a direction at right angles to said saw bar axis and being positioned on the same side of said axis as said saw handle so that said saw handle will be inverted and disposed at a convenient and comfortable angle for gripping by a hand of the operator when said attachment handle member is positioned uppermost and said handle member is gripped by the other hand of the operator, said hand grip portion also having an integral protective shield portion for said other hand of the operator, said shield portion being spaced from said handle member and positioned between said handle member and said bar.

3. An attachment for converting to a chain saw a portable electric motor-driven circular saw of the type including a frame, an electric motor mounted on said frame, and a drive shaft to which a circular saw blade may be secured, said attachment comprising a unitary hand grip and saw bar supporting member including a hand grip portion and an integral, flat body portion, said body portion having a forward edge formed with a plurality of work engaging teeth thereon, said body portion having an aperture therethrough spaced rearwardly of said forward edge, means on said body portion for securing the same to said frame with said shaft projecting through said aperture, means on said body portion adjacent said shaft for securing to said body portion one end of a flat, elongate chain saw guide bar with the plane of said bar parallel to said body and with said bar projecting forwardly of said forward edge, said hand grip portion including a handle member adapted to be gripped by the hand, said handle member being spaced from said body aperture in a direction substantially at right angles to the longitudinal axis of a saw bar secured to said body portion and being positioned on the same side of said axis as said saw handle, said handle member extending at right angles to the plane of said body portion, said hand grip portion also including a protective shield portion spaced from said handle member and positioned between said handle member and said bar.

4. An attachment for converting to a chain saw a portable electric motor-driven circular saw of the type including a frame, an electric motor mounted on said frame, and a drive shaft to which a circular saw blade may be secured, said attachment comprising a unitary hand grip and chain saw guide bar supporting member including a hand grip portion and an integral, flat body portion, said body portion including a forward edge formed with a plurality of work engaging teeth, said body portion having an aperture therethrough spaced rearwardly of said forward edge, means on said body portion for securing the same to said frame with said shaft projecting through said aperture, a flat, elongate chain saw guide bar secured to said body portion with the plane of said bar parallel to said body and with said bar projecting forwardly of said forward edge, said hand grip portion including a handle member adapted to be gripped by the hand, said handle member being spaced from said body aperture in a direction substantially at right angles to the longitudinal axis of a saw bar secured to said body portion and said handle member extending at right angles to the plane of said body portion, said hand grip portion also including a protective shield portion spaced from said handle member and positioned between said handle member and said bar.

5. An attachment for converting to a chain saw a portable electric motor-driven circular saw of the type including a frame, an electric motor mounted on said frame, and a drive shaft to which a circular saw blade may be secured, said attachment comprising a unitary hand grip and chain saw guide bar supporting member including a hand grip portion and an integral, flat body portion, said body portion including a forward edge formed with a plurality of work engaging teeth thereon, said body portion having an aperture therethrough spaced rearwardly of said forward edge, means on said body portion for securing the same to said frame with said shaft projecting through said aperture, means on said body portion adjacent said shaft for securing to said body portion one end of a flat, elongate chain saw guide bar with the plane of said bar parallel to said body and with said bar projecting forwardly of said forward edge, said hand grip portion including a handle member adapted to be gripped by the hand, said handle member being spaced from said body aperture in a direction substantially at right angles to the longitudinal axis of a chain saw guide bar secured to said body portion and, said handle member extending at right angles to the plane of said body portion, said hand grip portion including a guard element positioned forwardly of said handle member between said handle member and said bar secured to said body portion, said guard element being of generally concave-convex configuration with the hollow side of the element facing said handle member so that the rearwardly extending side portions of said guard element at least partially enclose the hand grasping said handle member.

References Cited in the file of this patent

UNITED STATES PATENTS

| D. 176,388 | Strunk | Dec. 13, 1955 |
| 2,348,588 | Arsneau | May 9, 1944 |
| 2,435,192 | Arsneau | Feb. 3, 1948 |
| 2,755,826 | Kiekhaefer | July 24, 1956 |
| 2,810,409 | Ibelle et al. | Oct. 22, 1957 |

FOREIGN PATENTS

| 118,817 | Australia | Aug. 14, 1944 |
| 926,036 | Germany | Apr. 4, 1955 |